(12) United States Patent
Zhai et al.

(10) Patent No.: US 12,134,870 B2
(45) Date of Patent: Nov. 5, 2024

(54) FLUCTUATION ZONE STATE SLOPE PROTECTION SYSTEM THAT RESPONDS TO HYDROLOGICAL CHANGES

(71) Applicant: SOOCHOW UNIVERSITY, Suzhou (CN)

(72) Inventors: Jun Zhai, Suzhou (CN); Rong Li, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 504 days.

(21) Appl. No.: 17/921,934

(22) PCT Filed: Nov. 3, 2020

(86) PCT No.: PCT/CN2020/126308
§ 371 (c)(1),
(2) Date: Oct. 27, 2022

(87) PCT Pub. No.: WO2021/047685
PCT Pub. Date: Mar. 18, 2021

(65) Prior Publication Data
US 2023/0175221 A1    Jun. 8, 2023

(30) Foreign Application Priority Data
Sep. 15, 2019 (CN) .......................... 201910867972.3

(51) Int. Cl.
*E02B 3/12* (2006.01)
*E02D 17/20* (2006.01)

(52) U.S. Cl.
CPC .............. *E02B 3/12* (2013.01); *E02D 17/20* (2013.01)

(58) Field of Classification Search
CPC . E02B 3/12; E02B 3/123; E02B 3/125; E02D 17/20; E02D 17/202; E02D 17/205
See application file for complete search history.

(56) References Cited

FOREIGN PATENT DOCUMENTS

| CN | 104790340 A | * | 7/2015 | ............... C02F 3/06 |
|----|-------------|---|--------|--------------------------|
| CN | 206721816 U |   | 12/2017 |                         |
| CN | 207845273 U |   | 9/2018 |                          |
| CN | 109056648 A |   | 12/2018 |                         |

(Continued)

Primary Examiner — Frederick L Lagman
(74) Attorney, Agent, or Firm — SZDC Law PC

(57) ABSTRACT

A fluctuation belt ecological slope protection system that responds to hydrological variation includes a runoff treatment system and an ecological floating island system. The runoff treatment system includes a grass planting side ditch and a water accumulation pit-pond. The ecological floating island system includes an ecological floating island and an ecological gabion base. The ecological floating island includes a flexible substrate, and aquatic plants. The ecological gabion base is positioned below the ecological floating island. The ecological protection system is suitable for a fluctuation belt and consists of a runoff treatment system and a separable ecological floating island system. Rain water on bank slope is purified and collected as wet soil is stabilized, the protection system responds to backwater water level variation in fluctuation belt, providing growing space for plants, organisms, and fish, following variation in water level, enriching the ecological environment of the fluctuation belt, and improving scenic effect.

10 Claims, 4 Drawing Sheets

(56) References Cited

FOREIGN PATENT DOCUMENTS

| | | | |
|---|---|---|---|
| CN | 208280088 U | | 12/2018 |
| CN | 110700186 A | | 1/2020 |
| CN | 211057724 U | | 7/2020 |
| CN | 117888499 A | * | 4/2024 |
| JP | H08120649 A | | 5/1996 |
| JP | H11256547 A | | 9/1999 |
| KR | 100381254 B1 | * | 4/2003 |
| KR | 20110121111 A | | 11/2011 |

* cited by examiner

FLUCTUATION ZONE STATE SLOPE PROTECTION SYSTEM THAT RESPONDS TO HYDROLOGICAL CHANGES

This application is the National Stage Application of PCT/CN2020/126308, filed on Nov. 3, 2020, which claims priority to Chinese Patent Application No. 201910867972.3, filed on Sep. 15, 2019, which is incorporated by reference for all purposes as if fully set forth herein.

TECHNICAL FIELD

The present invention relates to the field of ecological restoration of the abatement zone, and in particular to the fluctuation zone state slope protection system that responds to hydrological changes.

BACKGROUND TECHNIQUE

The subsidence zone is a phenomenon unique to rivers, lakes and reservoirs, which formed for two reasons: one is the seasonal water level rise and fall, and the other is the periodic water storage. Because of its long storage cycle and water level subsidence changes and the unmanaged state of storm water sewage, resulting in the region there are serious problems such as water and land cross pollution, water quality deterioration, soil erosion, vegetation growth difficulties, ecosystem damage.

The hydrological changes in the abatement zone include bank storm water and backwater. As the storm water in the fallout zone is usually managed in a natural way, domestic sewage is interspersed with it, leading to serious surface pollution. Moreover, the water storage cycle of Yangtze River is from November to April every year, which makes it difficult for vegetation to grow in the zone due to long-term flooding. Therefore, the bank slope in the floodplain should be resilient to the hydrological changes on the bank and maintain the stability of the ecosystem. At present, the research and application of ecological slope protection technology in the subsidence zone have been carried out in China, but there is less research on the slope protection system for coping with storm water and backwater at the same time, and it is still not widely used because of the limitation of water body rise and fall, and the overall landscape effect of rivers, lakes and reservoirs still cannot be improved.

Technical Problem

In order to achieve the above objective, the present invention provides an ecological slope protection system composed of runoff treatment system and separable eco-floating island system, which is suitable for the water-level fluctuating zone, which purifies and collects storm water on the bank slope, stabilizes the soil and water, and responds to changes in the backwater level to provide growth space for plants, organisms, fish, etc. As the water level changes, the ecological environment of the fluctuating zone is enriched and the landscape effect is improved.

Technical Solutions

In order to achieve the above objectives, the present invention provides the following technical solutions, a fluctuation zone state slope protection system that responds to hydrological changes, includes the runoff treatment system and the eco-floating island system; the runoff treatment system includes grass edge ditches and water storage ponds; and the eco-floating island system includes eco-floating islands, eco-gabion substrates; the eco-floating island includes flexible substrates and aquatic plants; the eco-gabion substrate is located below the eco-floating island; the rope is woven by nylon and glass fiber.

The present invention also discloses an fluctuation zone state slope protection system that responds to hydrological changes, includes buffer vegetation zone, runoff treatment system and the eco-floating island system; the runoff treatment system includes grass edge ditches and water storage ponds; and the eco-floating island system includes eco-floating islands, eco-gabion substrates; the eco-floating island includes flexible substrates and aquatic plants; the eco-gabion substrate is located below the eco-floating island; the rope is woven by nylon and glass fiber.

In the present invention, buffer vegetation zone, runoff treatment system and the eco-floating island system from up to down, or from up to down, the runoff treatment system and the eco-floating island system are arranged sequentially; from up to down refers to the flow direction of storm water in the berm. According to the same positional relationship, the planting grass side ditches are located up of the water storage ponds, and preferably, the grass edge ditches and water storage ponds are connected by inflow ditches.

In the present invention, grass edge ditches are laid with gravel layer, sand filter layer, soil layer, and plant layer from bottom to top; the water storage ponds are laid with gravel layer, sand filter layer, soil layer, and plant layer from bottom to top; the soil layer consists of a mixture of planting soil, filter sand and gravel; the thickness of the gravel layer range from 15 cm to 30 cm; the thickness of the sand filter layer range from 25 cm to 40 cm; the particle size of gravel range from 2 mm to 63 mm, and the particle size of the filter sand range from 0.06 mm to 2 mm. Preferably, the grass edge ditches and the water storage ponds are composed of geogrid wrapped with gravels or pebbles, wherein the thickness of the side wall range from 20 cm to 40 cm, and the particle size of the gravel or pebbles range from 2 mm to 60 mm; The plant beside the grass edge ditch and water storage ponds choose low-growing plants and resistant to scouring, such as root-developed plants such as dry umbrella grass, cattails, reeds, canna, rushes, iris, water onions, awns, hemerocallis, Chinese mosquitoes, and small woods, Pennisetum, etc. The specific gravel layer, sand filter layer, soil layer laying method and material purchase are all existing methods. The width and depth of the grass edge ditches and the water storage ponds can be determined in accordance with the site topography and storm water runoff; the grass edge ditches is mainly for the purification and filtration of runoff storm water, the impoundment pond is mainly used to accumulate storm water. If the impoundment pond is full, it will be discharged into the river through overflow. The volume of water stored in the grass side ditch is smaller than that of the impoundment pond. The specific volume is designed according to the actual topography. Further preferably, according to the actual location, the upper end of the diversion ditch is located at the gravel layer of the grass side ditch, and the lower end is located at the plant layer of the water storage ponds. Preferably, in the grass edge ditches, the thickness of the gravel layer range from 15 cm to 20 cm; the thickness of the sand filter layer range from 25 cm to 30 cm; the particle size of gravel range from 2 mm to 30 mm, and the particle size of the filter sand range from 0.06 mm to 0.3 mm; in the water storage ponds the thickness of the gravel layer range from 22 cm to 30 cm; the thickness of the sand filter layer range from 32 cm to 40 cm; the particle size of gravel range from 35 mm to 63 mm, and the particle size of the filter sand range from 0.8 mm to 2 mm.

In the present invention, the eco-floating island system includes eco-floating islands, eco-gabion substrates, eco-brick anchors, ropes; Further preferably, there are two eco-brick anchors between eco-floating islands with a rope, the connection bits are downside of the rope and eco-floating islands. The eco-gabion substrate is attached to the side wall of the river bed and has an inclined structure. Preferably, the upside of the eco-gabion substrate is equal to the highest water level and the downside is equal to the lowest water level. The eco-gabion substrate is located below the eco-floating island, which means that the eco-gabion substrate is located vertically below the eco-floating island; one end of the eco-floating island is located at the upper end of the eco-gabion substrate. Pulled by the ropes at both ends, when the water level is high, the base of the ecological gabion is separated from the eco-floating island, and above the base of the ecological gabion, when the water level is low, the eco-floating island is attached to the base of the ecological gabion. According to the above description, those skilled in the art know that the two ropes are different in length, and the specific length is designed according to the actual river bank, which is a conventional method.

In the present invention, the eco-floating island includes flexible substrates and aquatic plant, aquatic plant grows on the flexible substrates; the flexible substrates allow the eco-floating islands to fit on the surface of the ecological gabion substrates. Preferably, the flexible substrates are provided with a cavity and filling with purifying fillers plays a role in purifying water quality and adsorbing nutrients in the water. Preferably, the flexible substrates are composed of willow branches or/and reed roots, and the specific preparation method is conventional weaving, which can place and fix aquatic plants without-t affecting the realization of the technical effect of the system. The material used is ecological and environmentally friendly, and the substrate provides a growth substrate for plants. At the same time, the purification of multiple water bodies has a certain effect. By adsorbing organic nutrients in the water, it provides growth nutrients for plants on the floating island. The void structure of the matrix also provides a growth environment for microorganisms and small organisms in the water. The purifying filler is preferably an activated carbon block. Preferably, the length and width of the activated carbon block range from 5 cm to 15 cm and the height range from 3 cm to 10 cm. Recommended 10 to 15 activated carbon blocks per square meter of floating island (calculated based on the upper surface area). Preferably, there are geogrids outside the flexible substrate, and the outside flexible substrates are wrapped by mesh geogrids with interwoven net grass, which together act as a nested reinforcement and adsorb organic matter in the water and act as a substrate for plant growth.

In the present invention, eco-gabion substrates include geogrids, a gravel layer is installed in the geogrid, and there are porous bricks are piled on the gravels for microorganisms and fish inhabit; preferably, the particle size of the gravel range from 10 cm to 100 cm, and the gravel layer The porosity is controlled above 40% to facilitate the flow of water and the attachment of microorganisms; the holes of the porous bricks are round holes with a diameter of 10 cm.

In the present invention, the buffer vegetation zone has the effect of reducing the rate of storm water runoff and reducing soil erosion. It is beneficial to the purification of the planting side ditch, while the storm water stored in the water storage pond can be used as watering water, reducing the difficulty and cost of maintenance.

The slope protection system of the present invention includes a runoff treatment system for treating inflowing water from a slope bank and a separable eco-floating island system that responds to changes in the water level in the drawdown zone. The runoff treatment system includes two parts: grass edge ditches and water storage ponds. The water storage ponds are arranged down of the grass edge ditches, and the two are connected by diversion trenches arranged at intervals. Both the grass edge ditches and the water storage ponds are laid with a water-purifying substrate, and the drought-tolerant plants to water-resistant. The detachable eco-floating island system is composed of two parts: eco-floating islands are base on ecological gabion. When the water level is low, the eco-floating island is attached to the base of the ecological gabion, and when the water level is high, the eco-floating island is separated from the base of the ecological gabion; Aquatic plants are grown on the island.

In the present invention, in the rope, the volume ratio of nylon to glass fiber in the rope is 9 to 1. Both nylon and glass fiber are conventionally purchased products. The mutual weaving is also a conventional technology. Improve the water stability and mechanical strength of the rope with the compound of glass fiber.

Beneficial Effects

The beneficial effects of the present invention are as follows.

The present invention provides fluctuation zone state slope protection system that responds to hydrological changes. The separable eco-floating islands and eco-gabion substrates system can effectively solve the problem of difficult vegetation growth brought about by water level changes in the water fall zone, and at the same time, play a role in purifying water quality and providing habitat for fish and other biological microorganisms in the water; and the up runoff treatment systems intercept and purify through the grass side ditches, and the water storage ponds purify and store the water, which can effectively maintain the stability of soil and water while purifying water coming from the shore slope. And the stored storm water can be used as irrigation water in general, especially combined with the buffer vegetation zone to further improve the ability to maintain soil and water stability and purify storm water.

Additional aspects and advantages of the present invention will become apparent in the following description section, or as learned through the practice of the present invention.

Figure 1:
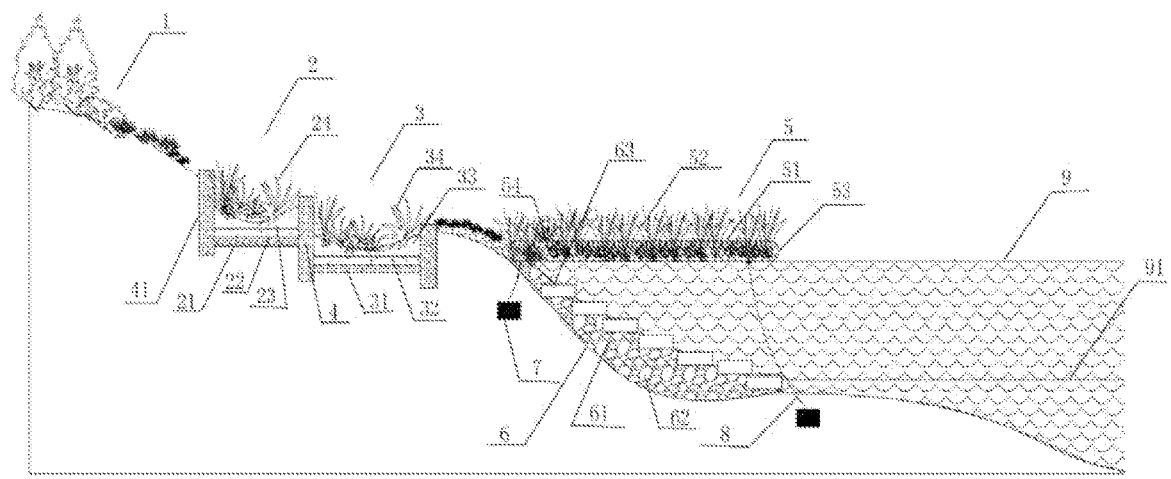
FIG. 1 is schematic diagram of the structure of fluctuation zone state slope protection system that responds to hydrological changes at the highest water level.
Figure 2:
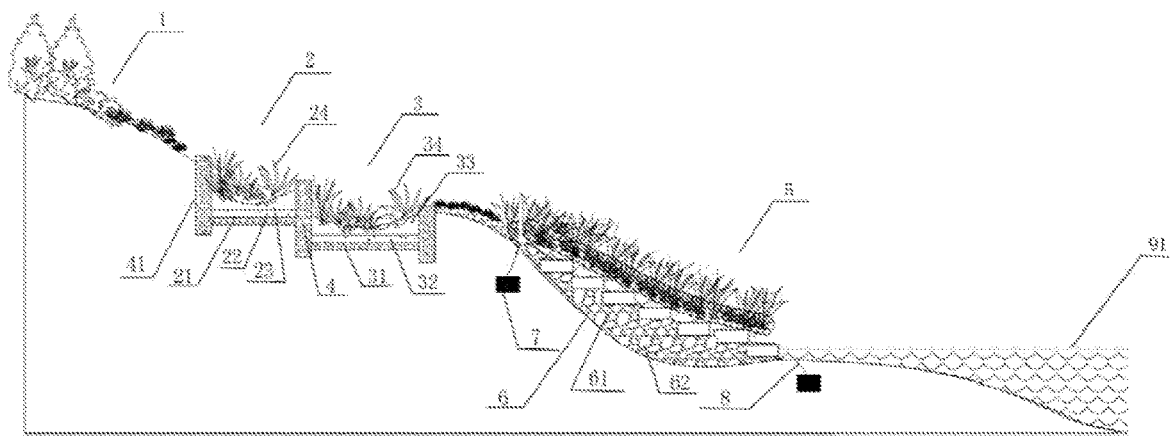
FIG. 2 is schematic diagram of the structure of fluctuation zone state slope protection system that responds to hydrological changes at the lowest water level.
Figure 3:
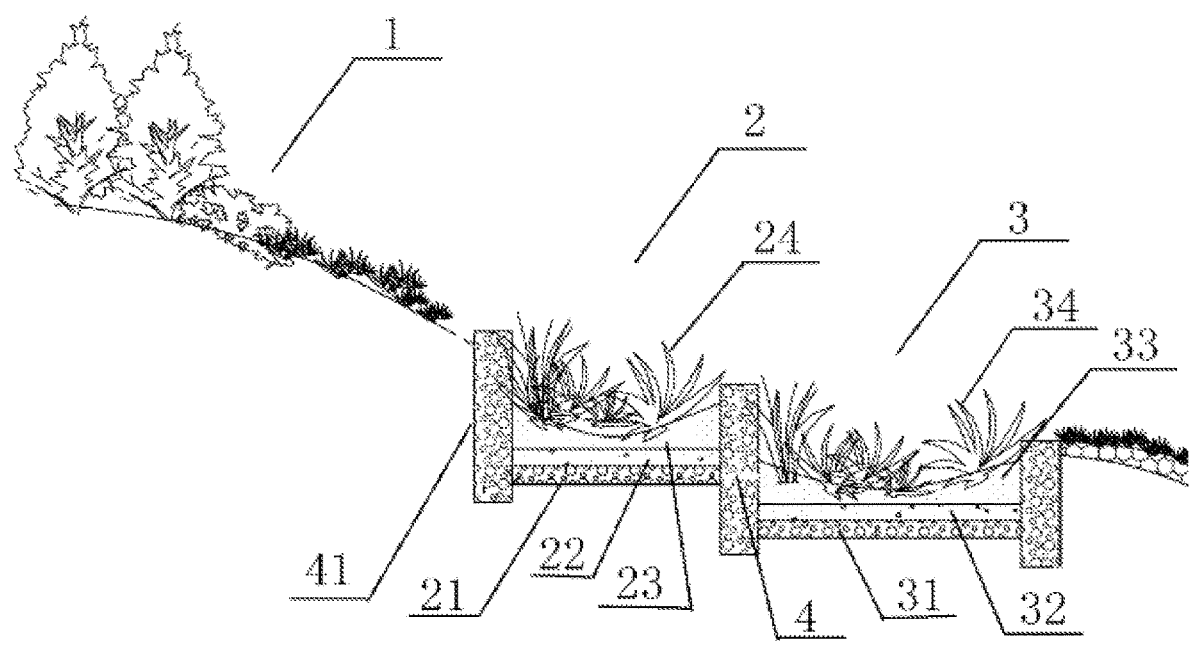
FIG. 3 is schematic diagram of the structure of buffer vegetation zone, runoff treatment system.
Figure 4:
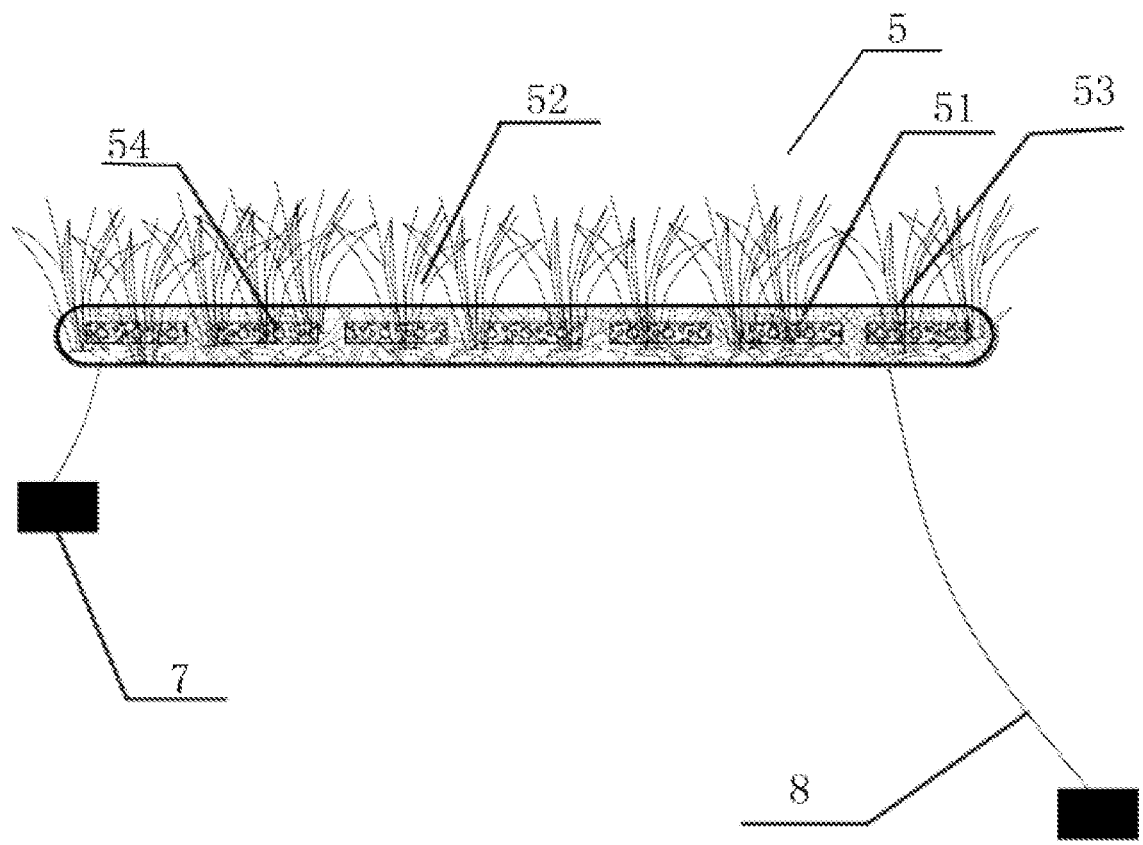
FIG. 4 is schematic diagram of the structure of eco-floating island system.
Figure 5:
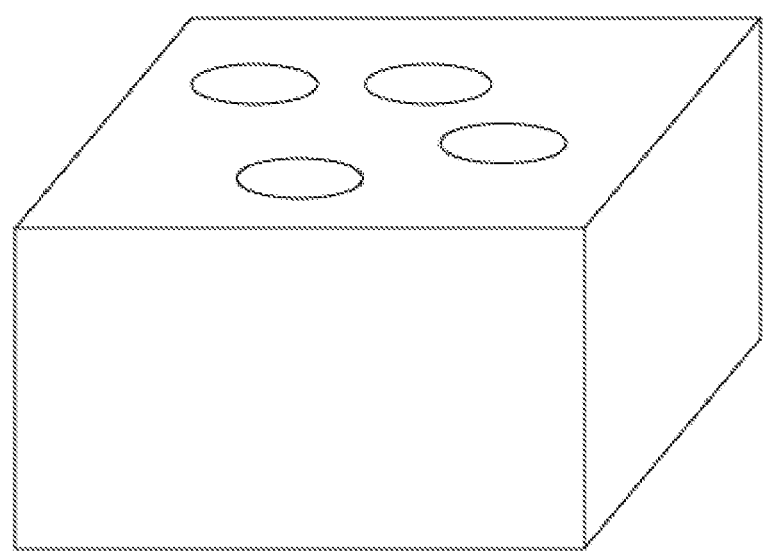
FIG. 5 is schematic diagram of the structure of the porous brick.

In the figure, buffer vegetation zone (1), grass edge ditch (2), gravel layer (21), sand filter layer (22), soil layer (23), plant layer (24), water storage pond (3), gravel layer (31), sand filter layer (32), soil layer (33), plant layer (34), inflow ditch (4), ecological retaining wall (41), eco-floating island (5), flexible substrate (51), aquatic plant (52), geogrid (53), activated carbon blocks (54), activated carbon block (6), geogrid (61), gravel layer (62), hole brick (63), anchor (7), rope (8), the highest water level (9), the lowest water level (91).

Examples of the Present Invention

The technical solutions of the present invention will be clearly and completely described below in conjunction with the accompanying drawings. Obviously, the described examples are part of the examples of the present invention, rather than all of the examples. Based on the examples of the present invention, all other examples obtained by those of ordinary skill in the art without creative work shall fall within the protection scope of the present invention. It should be noted that the examples of the application and the features in the Examples can be combined with each other if there is no conflict.

In the description of the present invention, it should be noted that the terms "center", "upper", "lower", "left", "right", "vertical", "horizontal", "inner", "outer", etc. The indicated orientation or positional relationship is based on the orientation or positional relationship shown in the drawings, and is only for the convenience of describing the present invention and simplifying the description, rather than indicating or implying that the pointed device or element must have a specific orientation or a specific orientation. The structure and operation cannot therefore be understood as a limitation of the present invention. In addition, the terms "first", "second", and "third" are only used for descriptive purposes, and cannot be understood as indicating or implying relative importance. The positional relationship involved in the present invention is the actual position.

In the example of the present invention, the diameter of the rope is 5 mm, which is conventionally woven (outsourced) by nylon and glass fiber in a rope making machine (Laizhou Yirun Machinery) according to a volume ratio of 9:1. Purchase conventional polyhexamethylene adipamide fiber (DuPont), and the glass fiber is commercially available conventional alkali-free glass fiber (Guangzhou and Taisi). For comparison, a nylon rope with a diameter of 5 mm prepared from a simple nylon is used to test the tensile strength of the two ropes using the same method as a universal testing machine. It is found that the tensile strength of the composite rope of the present invention is 1.13 times that of the simple nylon rope.

The following is a further explanation of the invention in conjunction with specific Examples.

Example 1

As shown from FIG. 1 to FIG. 5.

A fluctuation zone state slope protection system that responds to hydrological changes, includes buffer vegetation zone, runoff treatment system and the eco-floating island system, from up to down, the runoff treatment system and the eco-floating island system are arranged sequentially; the buffer vegetation zone are planted with conventional trees and flowers, which have the effect of reducing the rate of storm water runoff and reducing soil erosion.

Runoff treatment system includes grass edge ditch (2), water storage pond (3) and inflow ditches (4) are connected by grass edge ditch and water storage ponds, for treatment of incoming water from sloping banks; the grass edge ditches are laid with gravel layer (21), sand filter layer (22), soil layer (23), and plant layer (24) from bottom to top; the water storage ponds are laid with gravel layer (31), sand filter layer (32), soil layer (33), and plant layer (34) from bottom to top; The volume ratio of growing soil, sand filter, gravel in soil layer is 5:2:3; in the grass edge ditch, the thickness of gravel layer is 15 cm, the thickness of sand filter layer is 30 mm, the particle size of gravel range from 2 mm to 30 mm, the particle size of sand filter range from 0.06 mm to 0.3 mm; in a water storage pond, the thickness of gravel layer is 30 cm, the thickness of sand filter layer is 35 mm, the particle size of gravel range from 35 mm to 63 mm, the particle size of sand filter range from 0.8 mm to 2 mm; in soil layer, the particle size of gravel range from 5 mm to 15 mm, the particle size of sand filter range from 0.6 mm to 1 mm. Both the grass edge ditches and water storage ponds are composed of geogrid wrapped with pebbles, that are ecological retaining walls (41, marked one place), wherein the thickness of ecological retaining walls are 30 cm, the particle size of pebbles range from 10 mm to 30 mm. It is understandable that, for overflow, the height of the ecological retaining wall nearby the grassed gutter is higher than the height of the ecological retaining wall far from the grass edge ditch, the height of the ecological retaining wall needs to meet the requirements of storm water is able to flow from buffered vegetated zone into grass edge ditch. According to the actual location, the top of inflow ditches is located at grass edge ditch gravel layer, the lower end is located at water storage ponds plant layer, storm water flows slowly from the buffer vegetation area into the grass edge ditch, which after purification, flows into water storage ponds from the inflow ditches. When the storm water is super flow, it overflows into the river. The plant beside the grass edge ditch and water storage ponds choose low-growing, resistant to scouring, root-developed plants, such as *Cyperus involucratus Rottboll, Cortaderia selloana, Arundo donax* L., *Canna indica* L., *Juncus effusus* L., *Iris tectorum Maxim, Scirpus validus Vahl, Miscanthus sinensiscv., Hemerocallis hybrida Bergmans, Distylium chinense* (Fr.) *Diels, Pennisetum alopecuroides* (L.) *Spreng.*, etc. The detachable eco-floating island system is composed of two parts: eco-floating islands are base on ecological gabion. When the water level is low, the eco-floating island is attached to the base of the ecological gabion, and when the water level is high, the eco-floating island is separated from the base of the ecological gabion; Aquatic plants are grown on the island. The detachable eco-floating island system coping with water level changes in the subsidence zone, consists of eco-floating island (5), eco-gabion substrate (6), eco-brick anchors (7) and rope (8). The eco-floating island includes flexible substrates (51), aquatic plants (52), the aquatic plants grown on the flexible substrates; the flexible substrates are wrapped with geogrid (53), which has mesh structure, and the nets and grasses are interwoven together to act as a plant growth substrate. Flexible substrates are formed by interlocking willow branches. The material is friendly for ecological and environmentally. The substrate provides substrate for plants to grow while the purification of multiple water bodies has a certain role, by the adsorption of organic nutrients in the water to provide growth nutrients for plants on floating islands, the structure of substrate also provides an environment for microorganisms and small organisms in the water. The flexible substrates is equipped with a cavity, and the activated carbon block (54) is placed in the cavity for wet dosing, The length of the activated carbon block range from 10 cm to 15 cm, the width range from 5 cm to 8 cm, the width range from 3 cm to 10 cm. According to the upper surface area, there are 12 activated carbon block in per square meter of flexible substrates. The aquatic plants choose *Phragmites australis* ((av.), *Acorus calamus* L, *Eleocharis dulcis* (Burm.f.) *Trin, Scirpus validus Vahl, Lotus* flower, *Zizania latifolia* (Griseb.) *Stapf, Lythrum salicaria* L., *Typha orientalis* Presl., *Juncus effusus* L., *Canna indica* L., etc. The eco-brick anchors by rope connect down the flexible substrates. The rope forms traction on the eco-floating island according to the change of water level. The two eco-brick anchors (mark one) which connect two sides of the eco-floating island by ropes. The length of ropes is different, so that when the water level is at high, one side of eco-floating island nearby the river is closed to the top of eco-gabion substrate. The eco-gabion substrate affixes to sidewalls of riverbed with inclined structure, the top of eco-gabion substrate is flat with the highest of the water level, the bottom is flat with the lowest water level (91); the eco-gabion substrate is located vertical below at the eco-floating island. The eco-gabion substrate includes geogrid (61), geogrid includes gravel layer (62), the gravel is piled with porous bricks (63) for microorganisms and fish inhabit; the particle size of gravel range from 10 cm to 100 cm, the porosity of gravel layer is 45%/m$^3$, in order to facilitate the flow of water and the attachment of microorganisms. The hole type is a round of 10 cm in diameter of the porous brick.

Example 2

Figure 6:
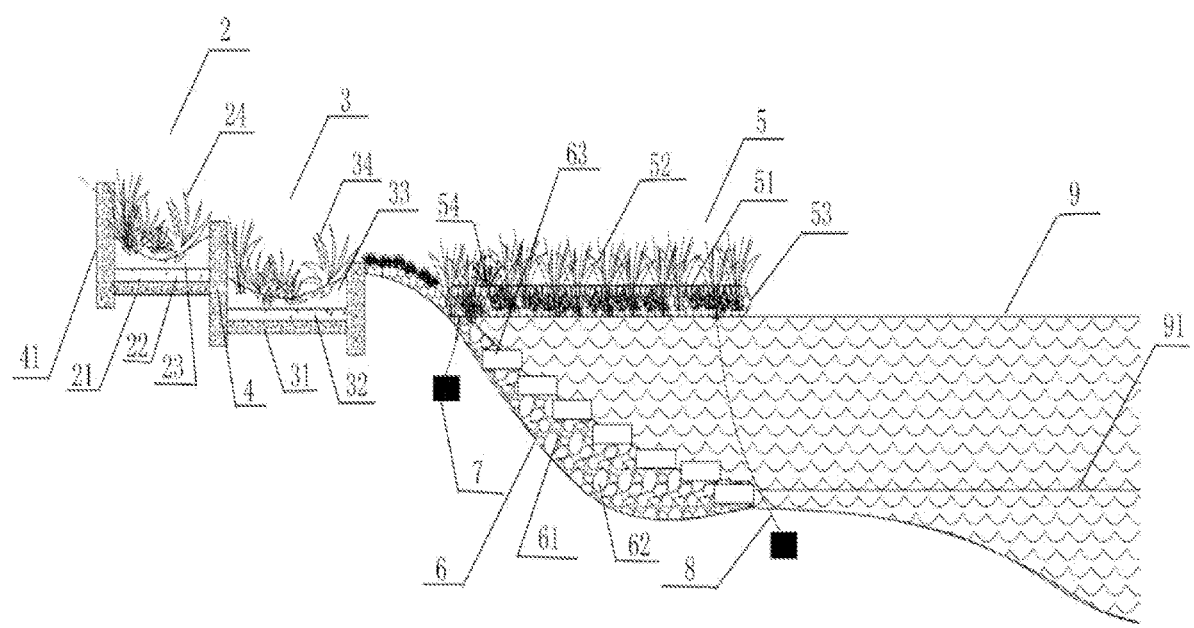
FIG. 6 is schematic diagram of the structure of fluctuation zone state slope protection system that responds to hydrological changes at the highest water level.

Based on the Example 1, there is no buffer vegetation zone, and the rest are the same to obtain a fluctuation zone state slope protection system that responds to hydrological changes, that consists of runoff treatment system and eco-floating island system, from up to down, runoff treatment system and eco-floating island system are arranged in sequence, see FIG. 6.

The runoff treatment system in this invention can solve the two problems of soil erosion due to rapid water catchment in the reservoir area and water pollution due to sewage entry. Firstly, the storm water via side slopes of buffer vegetation zone into the grass edge ditch, then flow from the diversion ditch to the water storage pond, the storm water is purified when flowing through, slowing down the flow rate, a part of storm water is stored, remaining storm water flowing into the river; the one side of eco-floating island upside of eco-gabion substrate. When the water level is high, pulled by the rope the eco-gabion substrate is separated from the eco-floating island. When the water level is low, on the eco-gabion substrate, the eco-floating island is attached to the base of the eco-gabion substrate.

Through modeling and simulation experiments (soil quality refers to the conventional subsidence zone river bank), in the Example 1 the uppermost stream uses of water (COD 40 mg/L, TN 10 mg/L, ammonia nitrogen 2 mg/L, TP 1.5 mg/L, SS 250 mg/L), the simulate run-off of storm water (0. 75 m/s), check the overflow water quality after passing through the buffer vegetation zone and runoff treatment system, COD 20 mg/L, TN 4 mg/L, ammonia nitrogen 0.9 mg/L, TP1 mg/L, SS50 mg/L, and running water for 10 h no soil loss was found; when the river level is at the highest, the eco-floating island is in a horizontal state, the left is the side closed to the river, that is the up of eco-gabion substrate is attached, when the river level is at the lowest, the left the eco-floating island remains unchanged, and the right is attached to the downside of the eco-gabion substrate to continue to maintain ecological stability. The water (COD (20 mg/L), TN 4 mg/L, ammonia nitrogen 0.9 mg/L, TP1 mg/L, SS 50 mg/L). After simulation, the river after five cycles of maximum water level-minimum water level, every 8 hours testing body of water between the eco-floating island and eco-gabion substrate, the quality of water gets better (COD 13 mg/L, TN 3 mg/L, ammonia nitrogen 0.6 mg/L, TP 0.6 mg/L, SS (30 mg/L); And whatever the aquatic plants or low shrubs, scouring resistance, rooted plant growth are all well.

In Example 2, the uppermost stream uses of water (COD 40 mg/L, TN 10 mg/L, ammonia nitrogen 2 mg/L, TP1.5 mg/L, SS 250 mg/L), the simulate run-off of storm water (0. 75 m/s), check the overflow water quality after passing through the buffer vegetation zone and runoff treatment system, COD 25 mg/L, TN 5 mg/L, ammonia nitrogen 1 mg/L, TP1.2 mg/L, SS 66 mg/L, and running water for 10h no soil loss was found, the result of the quality of water between the eco-floating island and eco-gabion substrate, is about the same with Example 1. If base on Example 1, remains the volumes of grass edge ditch and water storage ponds, but changes structural composition, after the same experiment, the water quality of overflow is (COD 2 2 mg/L, TN 4.2 mg/L, ammonia nitrogen 1 mg/L, TP1.1 mg/L, SS 58 mg/L). If based on the Example 2, removed the porous brick, after the same experiment, the water quality of overflow is (COD 18 mg/L, TN 3 mg/L, ammonia nitrogen 0.7 mg/L, TP0.6 mg/L, SS 35 mg/L). The above test methods are the conventional standard methods for water quality testing.

Finally, it is explained that the various materials involved in the present invention are commercially available. Based on the detailed description of the structure and the role of each part above, the specific preparation method is conventional technology, such as planting density in buffer vegetation zone, and the selection of plants satisfy the barrier and buffer for storm water. The size of each part of the runoff treatment system is designed according to the terrain, the eco-floating island system is designed according to the height of the drawdown zone and the terrain, and the specific laying of each functional layer is prepared as a conventional method; such as nylon and The glass fiber itself and the braided rope are the prior art; the above examples are only used to illustrate the technical solutions of the present invention, but not to limit it; although the present invention has been described in detail with reference to the foregoing examples, the common people in the field The skilled person should understand that: they can still modify the technical solutions described in the foregoing examples, or equivalently replace some or all of the technical features; and these modifications or replacements do not make the essence of the corresponding technical solutions deviate from the present invention. In addition, those skilled in the art can understand that although some examples described herein include certain features included in other examples but not other features, the combination of features of different examples means that they are within the scope of the present invention. Within and form different examples. For example, in the above claims, any one of the claimed examples can be used in any combination. The information disclosed in the background section is only intended to deepen the understanding of the overall background of the present invention, and should not be regarded as an acknowledgement or in any form implying that the information constitutes the prior art known to those skilled in the art.

The invention claimed is:

1. A fluctuation zone state slope protection system that responds to hydrological changes, comprising a runoff treatment system and an eco-floating island system;
wherein the runoff treatment system comprises grass edge ditches and water storage ponds; the eco-floating island system includes eco-floating islands, eco-gabion substrates, eco-brick anchors, ropes; the eco-floating islands include flexible substrates and aquatic plants; the eco-gabion substrates are located below the eco-floating island; and the rope are woven by nylon and glass fiber.

2. The fluctuation zone state slope protection system that responds to hydrological changes according to claim 1, wherein, from up to down, the runoff treatment system and the eco-floating island system are arranged sequentially; and the grass edge ditches and water storage ponds are connected by inflow ditches.

3. The fluctuation zone state slope protection system that responds to hydrological changes according to claim 1, wherein the grass edge ditches are laid with gravel layer, sand filter layer, soil layer, and plant layer from bottom to top; and the water storage ponds are laid with gravel layer, sand filter layer, soil layer, and plant layer from bottom to top; the soil layer consists of a mixture of planting soil, filter sand and gravel; the thickness of the gravel layer range from 15 cm to 30 cm; the thickness of the sand filter layer range from 25 cm to 40 cm; the particle size of gravel range from 2 mm to 63 mm, and the particle size of the filter sand range from 0.06 mm to 2 mm; and the grass edge ditches and the water storage ponds are composed of geogrid wrapped with gravels or pebbles.

4. The fluctuation zone state slope protection system that responds to hydrological changes according to claim 3, wherein, in the grass edge ditches, the thickness of the gravel layer range from 15 cm to 20 cm; the thickness of the sand filter layer range from 25 cm to 30 cm; the particle size of gravel range from 2 mm to 30 mm, and the particle size of the filter sand range from 0.06 mm to 0.3 mm; in the water storage ponds the thickness of the gravel layer range from 22 cm to 30 cm; the thickness of the sand filter layer range from 32 cm to 40 cm; the particle size of gravel range from 35 mm to 63 mm, and the particle size of the filter sand range from 0.8 mm to 2 mm.

5. The fluctuation zone state slope protection system that responds to hydrological changes according to claim 1, wherein the eco-floating island system includes eco-floating islands, eco-gabion substrates, eco-brick anchors, ropes; eco-brick anchor is connected to the eco-floating island by the ropes; the aquatic plants grow on the flexible substrates; and the flexible substrates are equipped with cavities inside and filled with purification fillers.

6. The fluctuation zone state slope protection system that responds to hydrological changes according to claim 5, where two eco-brick anchors are connected to eco-floating island by ropes respectively; the connection between the rope and the eco-floating island is located on the lower surface of the eco-floating island; the flexible substrate consists of willow branches or/and reed roots; the purification fillers are activated carbon blocks.

7. The fluctuation zone state slope protection system that responds to hydrological changes according to claim 1, wherein the eco-gabion substrates against the side wall of the riverbed, include geogrids, gravel layer, hole tiles.

8. The fluctuation zone state slope protection system that responds to hydrological changes according to claim 7, wherein the particle size of gravel ranges from 10 to 100 cm, and the hole of the porous brick is 10 cm in diameter.

9. The fluctuation zone state slope protection system that responds to hydrological changes according to claim 1, wherein the upper of the eco-gabion substrates are level with the highest water level and the lower are level with the lowest water level.

10. The fluctuation zone state slope protection system that responds to hydrological changes according to claim 1, wherein a volume ratio of nylon to glass fiber in the rope is 9 to 1.

* * * * *